April 21, 1964     D. G. PETERSON     3,129,906
ENGINE NACELLE

Filed Jan. 19, 1959                                   2 Sheets-Sheet 2

INVENTOR.
David G. Peterson
BY
ATTORNEY C. M. McKnight

United States Patent Office 3,129,906
Patented Apr. 21, 1964

3,129,906
ENGINE NACELLE
David G. Peterson, P.O. Box 2355, Oakland, Calif.
Filed Jan. 19, 1959, Ser. No. 787,429
1 Claim. (Cl. 244—42)

This invention relates to improvements in aircraft structure and more particularly, but not by way of limitation, to an improved nacelle structure for an aircraft engine.

In the development of the opposed engine having horizontal cylinders in the aircraft industry, the need was for utilization with the single engine airplane. The engine was mounted ahead of a larger sized fuselage, and thus there was no need to maintain the overall depth of the engine at a minimum. However, with the adaptation of the opposed engine for multi-engine aircraft wherein the engine is mounted on the wing thereof, it became apparent that the bulky engine nacelle structure had many disadvantages. It is desirable to maintain the nacelle structure at a minimum depth in order to reduce the drag on the aircraft and to maintain an aerodynamic symmetry for the aircraft and thus improve the performance qualities and overall efficiency thereof.

The original development of the power plant for single engine aircraft necessitated that the engine exhaust gases be discharged from below the fuselage and away from the windshield of the airplane to preclude any interference with the pilot's view therethrough. With the installation of the engine on the wing of the aircraft for multi-engine operation, the exhaust of the gases under the wing increases the velocity of the air therebelow with a resultant reduction in lift for the aircraft.

The present invention contemplates a novel installation of an aircraft engine of the horizontally opposed cylinder type on an aircraft wing whereby the depth of the nacelle structure is maintained at a minimum, and an airfoil configuration is attained to provide an aerodynamic clean line for the aircraft and reduce the drag thereon under flight conditions. In addition, the engine is mounted on the wing in an inverted position in order that the engine exhaust gases are directed rearwardly over the top of the wing. It will be apparent that the exhaust of the gases over the wing increased the velocity of the air, and it is well known that an increase in air velocity over the wing produces an increased lift for the airplane. Furthermore, the incoming cool air is directed around and over the engine cylinders before it is mixed with the exhaust gases, thereby providing an efficient cooling of the engine. Thus, the overall performance of the aircraft is improved with the installation of the inverted opposed engine with the thin nacelle structure on the wing thereof.

It is an important object of this invention to provide an improved multi-engine aircraft structure wherein the nacelle structure thereof is maintained at a minimum overall depth for reducing the drag on the aircraft.

It is another object of this invention to provide an improved aircraft structure wherein the engine nacelle is provided with an airfoil configuration substantially in accordance with the configuration of the leading edge of the aircraft wing in order to provide an aerodynamic clean line for the aircraft.

Another object of this invention is to provide an improved aircraft structure wherein the exhaust gases of the engine are directed rearward over the top of the wing to provide an increase in lift for the aircraft.

It is a further object of this invention to provide an improved aircraft structure wherein the incoming cool air in the engine is directed around the cylinders prior to mixing with the exhaust gases to increase the cooling efficiency thereof.

Still another object of this invention is to provide an improved utilization for the opposed engine in multi-engine aircraft which is simple and efficient in operation and economical and durable in construction.

Other objects and advantages of the invention will be evident from the following detailed description, read in conjunction with the accompanying drawings, which illustrate my invention.

Figure 1:
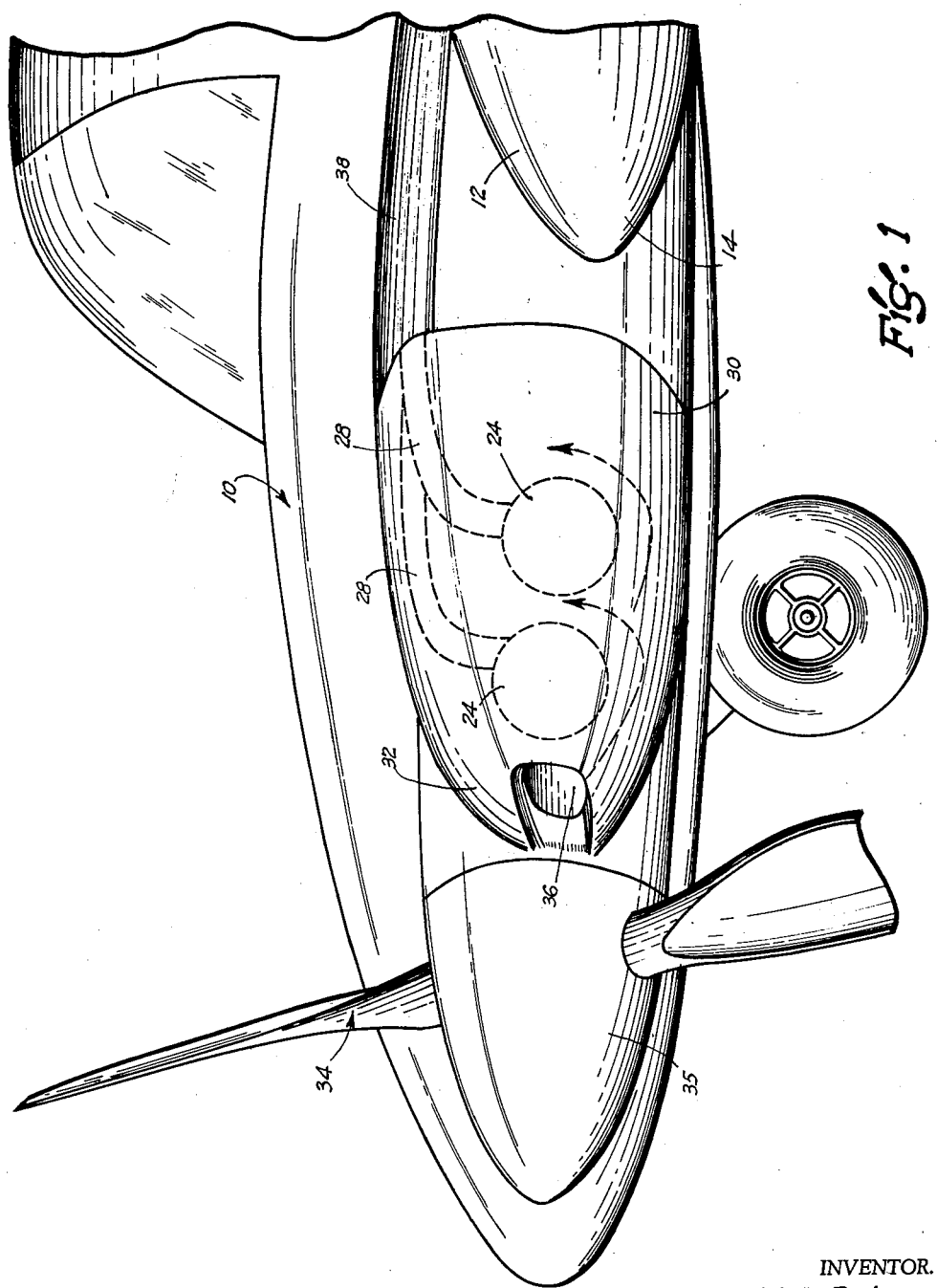
FIGURE 1 is a perspective side view of a portion of an aircraft embodying the novel engine and nacelle arrangement with portions shown in dotted lines for purposes of illustration.

Referring to the drawings in detail, reference character 10 indicates in general an airplane structure having the usual wings 12 provided thereon wherein only one wing is depicted for purposes of clarity. The leading edge 14 of the wings 12 is of an airfoil configuration, as clearly shown in FIG. 1, and as is well known in the industry. A horizontally opposed engine 16 is mounted on each of the wings 12 in any well known manner, preferably by means of an engine mount structure generally indicated at 18 and as disclosed in my co-pending application entitled "Engine Mount," Serial No. 787,658, filed in the United States Patent Office on January 19, 1959, now Patent No. 3,003,718. The engine accessories, such as the generator, starter, oil pump, and the like, generally indicated at 20, are mounted on an engine accessory case 22 as is shown in my co-pending application entitled "Engine Accessory Case," Serial No. 787,476, filed in the United States Patent Office on January 19, 1959. The accessory case 22 and the engine accessories 20 are disposed rearwardly of the engine 16, as clearly shown in FIG. 3, for a purpose as will be hereinafter set forth.

The engine 16 in each wing is normally provided with a plurality of oppositely disposed horizontally extending cylinders 24 and 26. The cylinders 24 are depicted schematically in dotted lines in FIG. 1. The engine 16 is mounted or secured to the engine mount structure 18 in an inverted position with respect to that of the normal engine mounting. Thus, the exhaust passageways 28 of the cylinders 24 extend upwardly and rearwardly with respect to the airplane 10, for a purpose as will be hereinafter set forth.

The engine or power plant 16 (preferably of the internal combustion type, but not limited thereto) and accessory case 22 having the engine accessories 20 secured thereto are encased within a nacelle structure 30. It will be apparent that the disposition of the engine accessories 20 rearwardly of the engine 16 will permit the overall depth of the engine to be constructed at a minimum. Thus, the nacelle structure 30 may be extremely attenuated in order to encase the engine, and structurally the overall depth of the nacelle 30 is maintained substantially equal to the thickness of the wing 12. The forward portion 32 of the nacelle 30 is of substantially constant thickness in transverse cross section and extending into an airfoil configuration substantially conforming to the airfoil configuration of the leading edge portion 14 of the wings 12.

Figure 2:
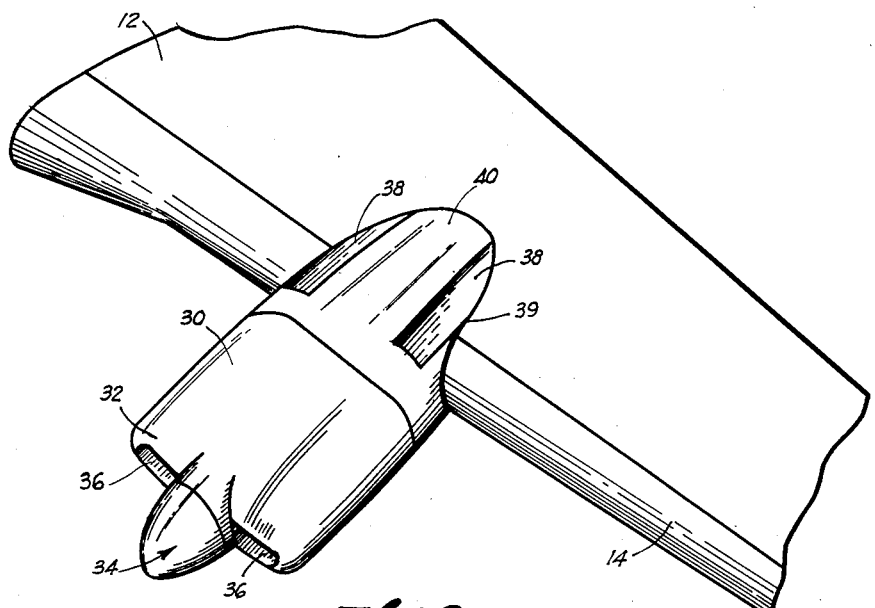
FIGURE 2 is a perspective view of a portion of an aircraft wing depicting the nacelle structure secured thereto.
Figure 3:
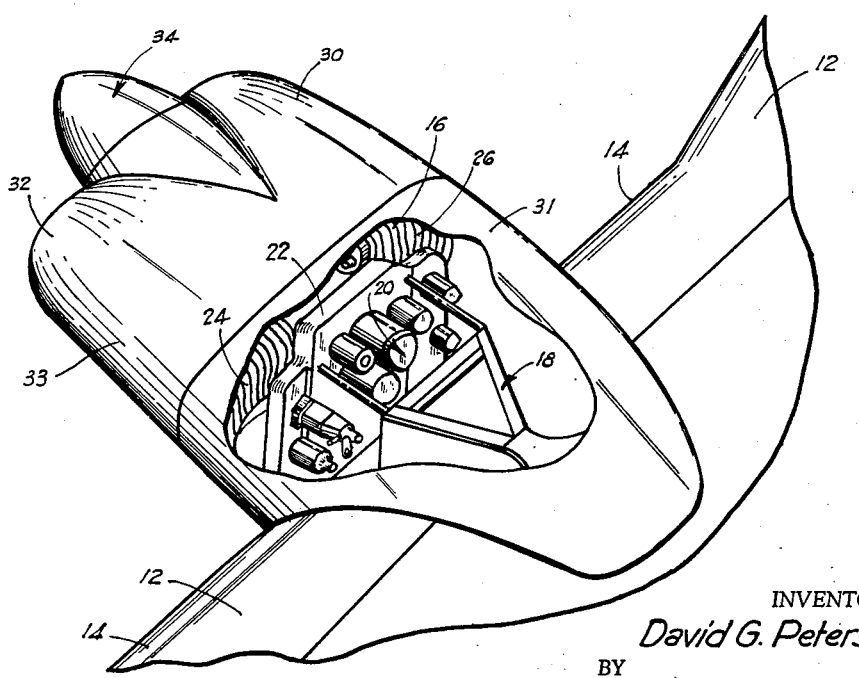
FIGURE 3 is a perspective view of an aircraft wing having the novel nacelle structure secured thereto and with a portion broken away for purposes of illustration.

As shown in FIG. 1, the upper portion 15 of the leading edge 14 of the wing 12 progressively tapers upwardly, and at the top of the nacelle 30 blends therein at a point substantially media of the outlet passageways 38, such as shown at 39 in FIG. 2, in order to provide the symmetrical blending of the nacelle 30 and the wing 12 in a substantially airfoil configuration. The nacelle structure 30 is provided with a rear housing section 31 which is secured in any suitable manner (not shown) to the leading edge 14 of the wings 12 (FIGS. 2 and 3).

The forward or front section 33 of the nacelle 30 is removably secured in any suitable manner (not shown) to the rearward section 31, as is well known in the art. Further, the opposite sides of the front section 33 may be suitably hinged (not shown) to permit opening of the sides of the forward nacelle section 33 as is well known in the art. The overall configuration of the composite sections 31 and 33 of the nacelle 30 is constructed to effect an airfoil configuraton blending with the airfoil shape of the leading edge 14 of the wing 12. A suitable propeller assembly, generall indicated at 34, including a propeller spinner 35, is provided at the forward portion 32 of the nacelle 30 and is centrally disposed thereon, as is well known.

An intake portion 36 is provided on each side of the propeller assembly 34 in the front portion 32 of the nacelle 30. Outlet ports or channels 38, preferably two, but not limited thereto, are provided in substantial alignment with the intake ports 36, and are disposed at the rear portion 40 of the nacelle 30. Each of the outlet channels or passageways 38 extends longitudinally in the nacelle 30 to provide communication between the interior thereof and the exterior of the aircraft at a point above the wing 12. The exhaust passageways 28 of the engine 16 are in communication with the outlet channels 38, thus providing for a discharge of the exhaust gases over the top of the wings 12. The cool air from the intake ports 36 circulates downwardly around the engine cylinders 24 and 26, as indicated by the arrows in FIG. 1 (the cylinders 24 only are depicted in FIG. 1), and hence upwardly therearound for discharge into the outlet channels 38 wherein the intake air is mixed with the exhaust air discharging from passageways 28. It will be apparent that the cool air moving into the proximity of the engine 16 provides for a cooling of the cylinders 24 and 26, particularly since the cool air passes around the cylinders prior to coming into contact with the hot exhaust gases.

By way of summary, the opposed engine 16 is mounted on the wings 12 in an inverted position whereby the exhaust passageways are located at the top of the cylinders 24 and 26 in order that the exhaust gases will be discharged upwardly and rearwardly therefrom. The mounting of the engine accessories 20 at the rear of the engine permits a structural design wherein the overall depth of the engine is maintained at a minimum, thereby permitting the nacelle structure encasing the engine to be extremely thin, and of an airfoil configuration substantially the same as the leading edge of the wings 12, thus reducing the drag on the aircraft and greatly increasing the performance qualities thereof. In addition, the cool intake air is moved through the engine in a manner whereby it passes around the cylinders for an efficient cooling of the cylinders prior to a mixing of the intake air with the hot exhaust gases. The mixture of exhaust gases and intake air is discharged rearwardly of the nacelle 30 and over the top of the wing 12, thereby increasing the air velocity over the wing. An increased performance for the aircraft is realized with this novel structural arrangement since the airfoil shape of the nacelle 30 is substantially identical to the shape and thickness of the wing, thereby adding to the lift area at a point on the wing where the air velocity is relatively high and concentrated due to its location with respect to the propeller. This is particularly true at low flight speeds when the ratio of air velocity behind the propeller is the greatest, such as during take off, climbing, and in a single engine operation where air lift is most desirable.

From the foregoing, it will be apparent that the present invention contemplates a novel aircraft structure wherein the nacelle structure of wing mounted engines is maintained at a minimum overall depth thereby increasing the efficiency in the performance of the aircraft. In addition, the engine is mounted on the wing in an inverted position whereby the intake air may be utilized for an efficient cooling of the cylinders, and the exhaust gases and intake air are discharged over the top of the wing to increase the lift thereof. The novel engine arrangement and structure are simple and efficient in operation and economical and durable in construction.

Changes may be made in the combination and arrangement of parts as heretofore set forth in the specification and shown in the drawings, it being understood that any modification in the precise embodiment of the invention may be made within the scope of the following claim without departing from the spirit of the invention.

I claim:

In an aircraft having wings of an airfoil configuration provided thereon, a horizontally opposed piston engine carried by each of the wings, the engine accessories mounted rearwardly of the engine to provide a substantially reduced overall depth for the engine, an attenuated nacelle structure encasing each of the engines and secured to the respective wing, the nacelle having a forward portion of substantially constant transverse depth, said nacelle increasing in depth as it approaches the leading edge of the wing and decreasing in depth thickness as it approaches the trailing edge of the wing, said maximum depth of the nacelle maintained substantially equal to the thickness of the wing, and outlet passageways provided in the upper rear portion of the nacelle for discharging exhaust gases and the intake air over the top of the wing for increasing the lift thereof.

References Cited in the file of this patent

UNITED STATES PATENTS

| 2,048,399 | Loening | July 21, 1936 |
| 2,081,490 | Marski | May 25, 1937 |
| 2,119,181 | Sulnier | May 31, 1938 |
| 2,396,911 | Anxionnaz et al. | Mar. 19, 1946 |
| 2,605,062 | Tyler | July 29, 1952 |

OTHER REFERENCES

Jane's "All the World's Aircraft," 1956–1957, pages 246, 247,